US011585998B2

(12) United States Patent
Kumar (10) Patent No.: US 11,585,998 B2
(45) Date of Patent: Feb. 21, 2023

(54) OPTICAL FIBRE CABLE CLAMPING APPARATUS

(71) Applicant: Sterlite Technologies Limited, Gurgaon (IN)

(72) Inventor: Shantha Kumar, Gurgaon (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/485,467

(22) Filed: Sep. 26, 2021

(65) Prior Publication Data

US 2022/0317406 A1    Oct. 6, 2022

(51) Int. Cl.
*G02B 6/44* (2006.01)
*G02B 6/36* (2006.01)

(52) U.S. Cl.
CPC ......... *G02B 6/4471* (2013.01); *G02B 6/3636* (2013.01); *G02B 6/4477* (2013.01)

(58) Field of Classification Search
CPC ... G02B 6/3636; G02B 6/4471; G02B 6/4477
See application file for complete search history.

(56) References Cited

U.S. PATENT DOCUMENTS

| | | | | |
|---|---|---|---|---|
| 4,630,888 A * | 12/1986 | Dubar | ................. | G02B 6/4427 385/76 |
| 5,598,500 A * | 1/1997 | Crespel | ................. | H02G 15/007 385/100 |
| 7,512,304 B2 * | 3/2009 | Gronvall | ............. | G02B 6/3897 385/139 |
| 7,844,158 B2 * | 11/2010 | Gronvall | ............. | G02B 6/4441 385/139 |
| 10,890,730 B2 * | 1/2021 | Petersen | ............. | G02B 6/4471 |
| 2009/0046985 A1 * | 2/2009 | Gronvall | ............. | G02B 6/4442 385/135 |

* cited by examiner

*Primary Examiner* — Ryan A Lepisto
(74) *Attorney, Agent, or Firm* — Steven R. Fairchild; Arun Narasani (57) ABSTRACT

The present invention discloses an optical fibre cable clamping apparatus (100) for clamping an optical fibre cable attached to a base comprising an upper clamp member and a lower clamp member, a grooved fibre extension for placing optical fibre elements and two grooved strength member extensions formed in the upper clamp member and the lower clamp member. In particular, the two grooved strength member extension is coupled to attach two strength members.

17 Claims, 6 Drawing Sheets

OPTICAL FIBRE CABLE CLAMPING APPARATUS

CROSS-REFERENCE TO RELATED APPLICATIONS

This application claims the benefit of Indian Application No. 202111015043 titled "Optical Fibre Cable Clamping Apparatus" filed by the applicant on 31 Mar. 2021, which is incorporated herein by reference in its entirety.

Field of the Invention

Embodiments of the present invention relate to the field optic fibre cable telecommunication systems. And more particularly, relates to an optical fibre cable clamping apparatus used in the optic fibre cable telecommunication systems.

Description of the Related Art

A distributed fibre network typically includes a large network of installed optical fibre cables connected to multiple electronic and mechanical devices. The optical fibre cables initiate from multiple terminals and are periodically opened and spliced for allowing data to be distributed to other cables in branches of the distributed fibre network.

In particular, the optical fibre cables' branches may be further distributed until the distributed fibre network reaches individual homes, businesses, offices, premises, and the like with use of telecommunications closures/enclosure such as splice (en)closures. The opened regions in the optical fibre cables are protected by the splice closures to protect exposed fibres and interiors of the optical fibre cables. The splice closures have multiple input and output ports for entry and exit of the optical fibre cables. Traditionally, the splice closures are designed to facilitate management and protection of individual spliced fibres.

Further, the optical fibre cables in the distributed fibre network may be installed on different support structures like walls, poles and underground structures and environments.

Traditionally, different telecommunications closures with application specific designs are required for each support structure. The different closure designs are required for different mounting orientations like horizontal and vertical orientations. Additional splitter enclosures are required for signal distribution into multiple fibres. Moreover, the use of different closures with different strength and performance for different installation environments arise a challenge in griping, clamping and securing a fibre reinforced plastic (FRP) central loose tube cable within a very less space inside 8 Port/12 Port and 4 Port terminals. Also, safely guiding the FRP loose tube cable to receptacles of the aforesaid terminals is a big challenge in the present scenario. Some of the prior art references are given below:

US patent application "US648734461" discloses a watertight inlet device for inserting a cable containing optical fibers into a chamber or into a container via an inlet passageway provided for this purpose. The device is fitted to the cable and secured to the strength members thereof before the cable is inserted into the chamber or container, the outer sheath of the cable further being secured directly on the watertight inlet device, the watertight inlet device then being received by being threaded into the chamber or container, and being locked therein by keying.

Another US patent application "US626921461" discloses an optical fiber organizer and a box for receiving it. The inlets for the optical cables project side-by-side in row abreast from the same short side of the box bottom and the organizer includes a pedestal which receives, in a nested manner, stackable modules for holding cassettes. The pedestal is made of a plastics material and has an outside shape that is rounded. A transit empty space is provided before the pedestal for the purpose of passing the fibers, and a storage empty space is provided after the pedestal for the purpose of storing standby fibers.

Yet US patent application "US887988362" discloses an optical fiber cable inlet device and telecommunications enclosure system, where an inlet device is described for inserting a cable containing optical fibers into a telecommunications enclosure. The inlet device includes a housing with a strength member securing section configured to fasten at least one strength member to the housing. The inlet device further includes a fiber guide device. The inlet device may be used in a single fiber optical cable assembly or multi-fiber optical cable assembly.

However, the prior art fails to disclose any significant considerations to counter drawbacks associated with griping, clamping and securing the FRP central loose tube cable within the very less space inside the 8 Port/12 Port and 4 Port terminals. Thus, in light of the above-stated discussion and to overcome the above stated disadvantages, there is a need to develop an apparatus and a method for clamping optical fibre cable.

Hence, the present invention focuses on optical fibre cable clamping apparatus and method of clamping.

Any references to methods, apparatus or documents of the prior art are not to be taken as constituting any evidence or admission that they formed, or form part of the common general knowledge.

SUMMARY OF THE INVENTION

An embodiment of the present invention relates to an optical fibre cable clamping apparatus for clamping an optical fibre cable attached to a base. In particular, the optical fibre cable clamping apparatus includes an upper clamp member, a lower clamp member operably coupled to the upper clamp member and the base, a grooved fibre extension formed between the upper clamp member and the lower clamp member, a plurality of optical fibre elements securely clamped to the optical fibre cable clamping apparatus and placed in the grooved fibre extension and a two grooved strength member extension operably coupled with the upper clamp member and the lower clamp member.

In accordance with an embodiment of the present invention, the two grooved strength member extension is operably coupled to attach with two strength members.

In accordance with an embodiment of the present invention, the two strength members are positioned diametrically opposite to each other and one or more optical fibre elements in the optical fibre cable.

In accordance with an embodiment of the present invention, the two strength members are attached to the two grooved strength member extension by a glue.

In accordance with an alternative embodiment of the present invention, the two strength members are attached to the two grooved strength member extension by one or more crimps.

In accordance with an embodiment of the present invention, each of the two grooved strength member extension has at least one cavity with one or more crimp sleeves for crushing onto the two strength member of the optical fibre cable thereby preventing outward axial movement of the optical fibre cable by application of force.

In accordance with an embodiment of the present invention, one or more crimp sleeves is locked inside the corresponding strength member extension of the two grooved strength member extension. Particularly, the crimp sleeves prevent movement of the two strength members. Moreover, the crimp sleeves provide resistance to axial pull force of the two strength members.

In accordance with an embodiment of the present invention, the two grooved strength member extension is positioned at an angle to the grooved fibre extension.

In accordance with an embodiment of the present invention, the crimp sleeves are locked inside corresponding to the two strength members of the two grooved strength member extension.

In accordance with an embodiment of the present invention, the upper clamp member and the lower clamp member are coated with an epoxy coating.

In accordance with an embodiment of the present invention, the optical fibre cable clamping apparatus further comprises at least one elongated member on the first side of the lower clamp member and the upper clamp member. In particular, at least one elongated member is a screw. Moreover, the first side of the lower clamp member is operatively coupled to the base. Furthermore, the base has at least one cavity to accommodate the elongated member thereby preventing outward axial movement of the optical fibre cable.

In accordance with an embodiment of the present invention, the optical fibre cable clamping apparatus also comprises at least two anchor hooks operably configured to lock the upper clamp member with the lower clamp member. In particular, the anchor hooks are provided on anyone of the upper clamp member and/or the lower clamp member.

In accordance with another embodiment of the present invention, the optical fibre cable clamping apparatus clamps the optical fibre cable with a terminal having a staggered port.

In accordance with another embodiment of the present invention, the optical fibre cable clamping apparatus is configured to clamp and secure double FRP optical fibre cables.

In accordance with another embodiment of the present invention, the optical fibre cable clamping apparatus prevents axial movements of the double FRP optical fibre cables.

Another embodiment of the present invention relates to a method of clamping an optical fibre cable in an optical fibre cable clamping apparatus comprising steps of attaching optical fibre cable clamping apparatus with the base of the optical fibre cable clamping apparatus, positioning an upper clamp member with a lower clamp member, forming a grooved fibre extension coupled to the lower clamp member and the upper clamp member, placing one or more optical fibre elements in the grooved fibre extension, securely clamping one or more optical fibre elements to the optical fibre cable clamping apparatus and attaching a two grooved strength member extension with the upper clamp member and the lower clamp member. Subsequently, the two grooved strength member extension is operably coupled to attach two strength members.

In accordance with an embodiment of the present invention, the method comprising a step of positioning the two strength members diametrically opposite to each other.

Alternatively, positioning the two strength members diametrically opposite plurality of optical fibre elements in the optical fibre cable.

In accordance with an embodiment of the present invention, the two strength members are attached to the two grooved strength member extension by a glue and/or a plurality of crimps.

In accordance with an embodiment of the present invention, the method comprises coating the upper clamp member and the lower clamp member with an epoxy coating.

In accordance with an embodiment of the present invention, the method comprises positioning an at least one elongated member on a first side of the lower clamp member and the upper clamp member and locking the upper clamp member with the lower clamp member with anchor hooks.

In accordance with another embodiment of the present invention, the method comprises clamping the optical fibre cable with a terminal having a staggered port.

These and other aspects of the invention herein will be better appreciated and understood when considered in conjunction with the following description and the accompanying drawings. It should be understood, however, that the following descriptions, while indicating preferred examples and numerous specific details thereof, are given by way of illustration and not of limitation. Many changes and modifications may be made within the scope of the invention herein without departing from the spirit thereof, and the invention herein include all such modifications.

The foregoing objectives of the present invention are attained by employing an optical fibre cable clamping apparatus and method of clamping thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The invention herein will be better understood from the following description with reference to the drawings, in which.

ELEMENT LIST

Optical Fibre Cable Clamping Apparatus 100
Lower Clamp Member 102

At Least One Elongated Member 104
Upper Clamp Member 106
Optical Fibre Elements 108
Grooved Fibre Extension 110
Optical Fibre Cable 112
Crimp Sleeves 202
Two Strength Members 204
Two Grooved Strength Member Extension 206
Terminal 302
Base 304
Staggered Port 502

The method and apparatus illustrated in the accompanying drawings, throughout which like reference letters indicate corresponding parts in the various figures.

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

The present invention relates to an optical fibre cable clamping apparatus and a method thereof.

The principles of the present invention and their advantages are best understood by referring to FIG.1 to FIG. 6. In the following detailed description numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The accompanying drawings are used to help easily understand various technical features and it should be understood that the implementations presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1:
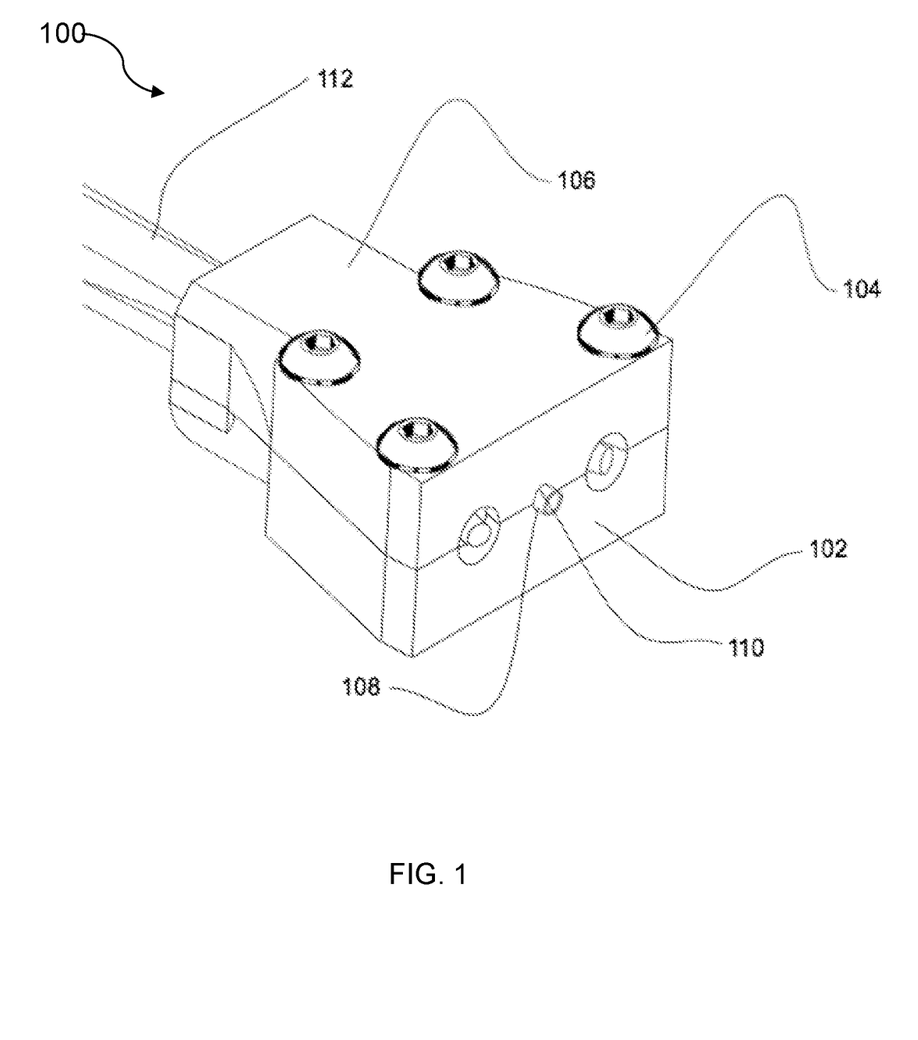
FIG. 1 is a pictorial representation illustrating a perspective view of an optical fibre cable clamping apparatus in accordance with an embodiment of the present invention.
Figure 3:
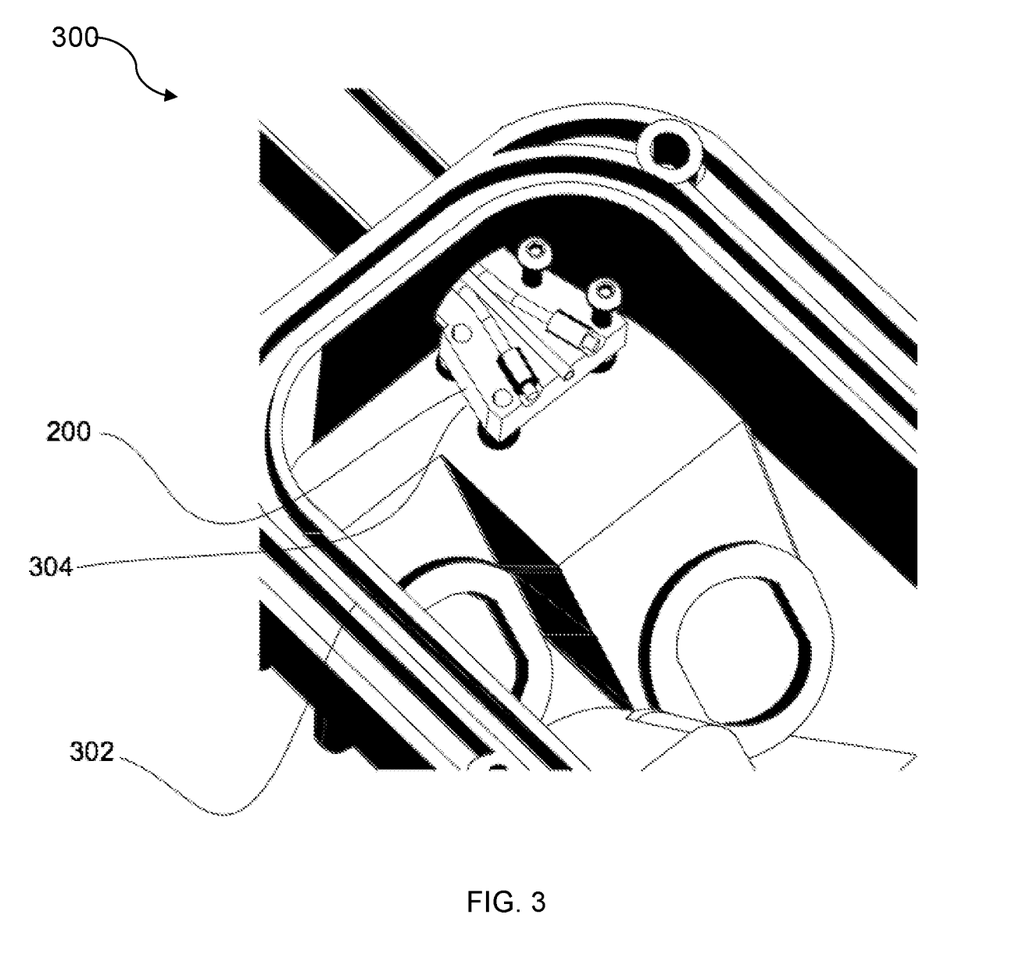
FIG. 3 is a pictorial representation illustrating a first perspective view of the optical fibre cable clamping apparatus inside a terminal in accordance with an embodiment of the present invention.
Figure 4:
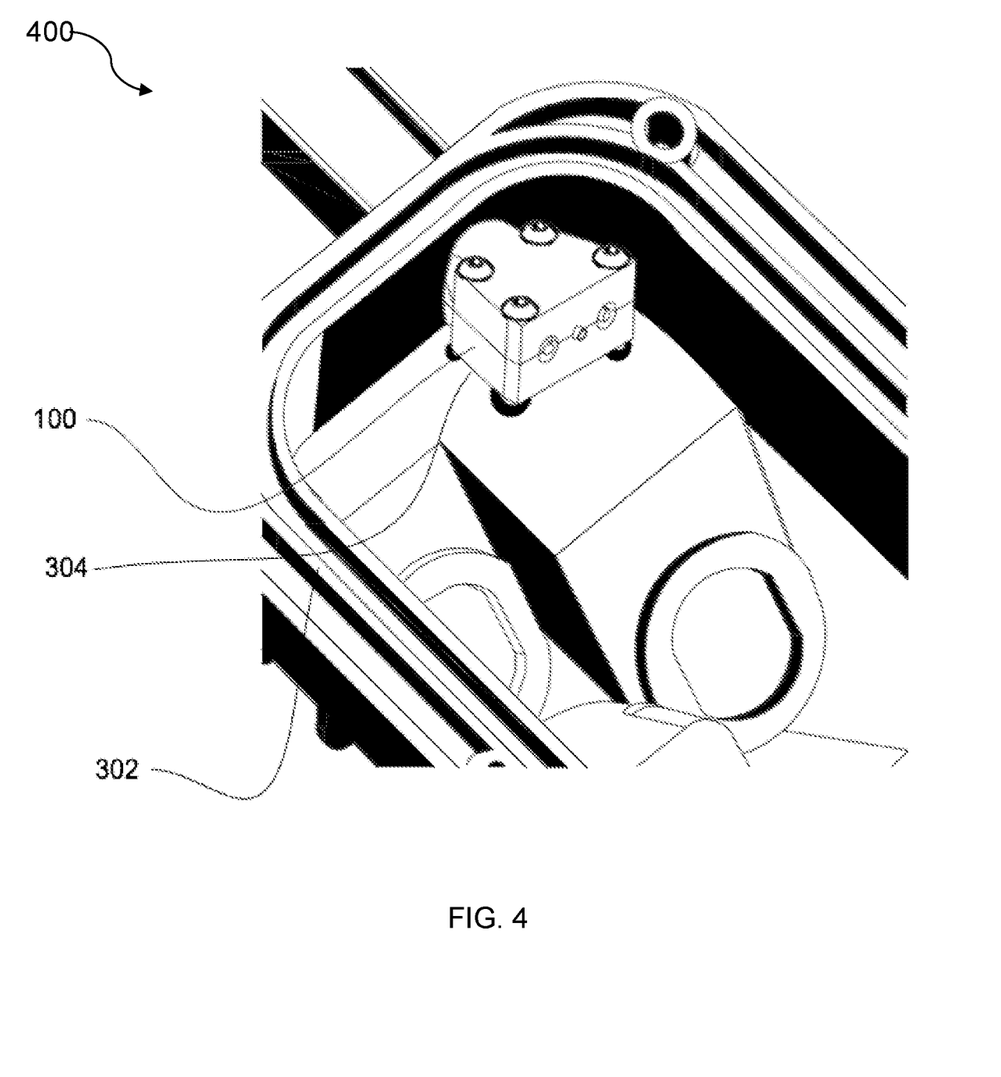
FIG. 4 is a pictorial representation illustrating a second perspective view of the optical fibre cable clamping apparatus inside the terminal in accordance with an embodiment of the present invention.

FIG. 1 is a pictorial representation illustrating a perspective view of an optical fibre cable clamping apparatus in accordance with an embodiment of the present invention. In particular, the optical fibre cable clamping apparatus 100 for clamping an optical fibre cable 112 attached to a base 304. Particularly, the optical fibre cable clamping apparatus 100 comprises lower clamp member 102 operably coupled to the upper clamp member 106 and the base 304.(As illustrated in FIG. 3 and FIG. 4), the grooved fibre extension 110 formed in the upper clamp member 106 and the lower clamp member 102, one or more optical fibre elements 108 securely clamped to the optical fibre cable clamping apparatus 100 and placed in the grooved fibre extension 110 and a two grooved strength member extension 206.

In accordance with an embodiment of the present invention, at least one elongated member 104 provides coupling of the lower clamp member 102 with the upper clamp member 106. In particular, at least one elongated member 104 is on the first side of the lower clamp member 102 and the upper clamp member 106. Moreover, the first side of the lower clamp member 102 is operatively coupled to the base 304. Furthermore, the base 304 has at least one cavity to accommodate at least one elongated member, thereby preventing outward axial movement of the optical fibre cable 112.

Figure 2:
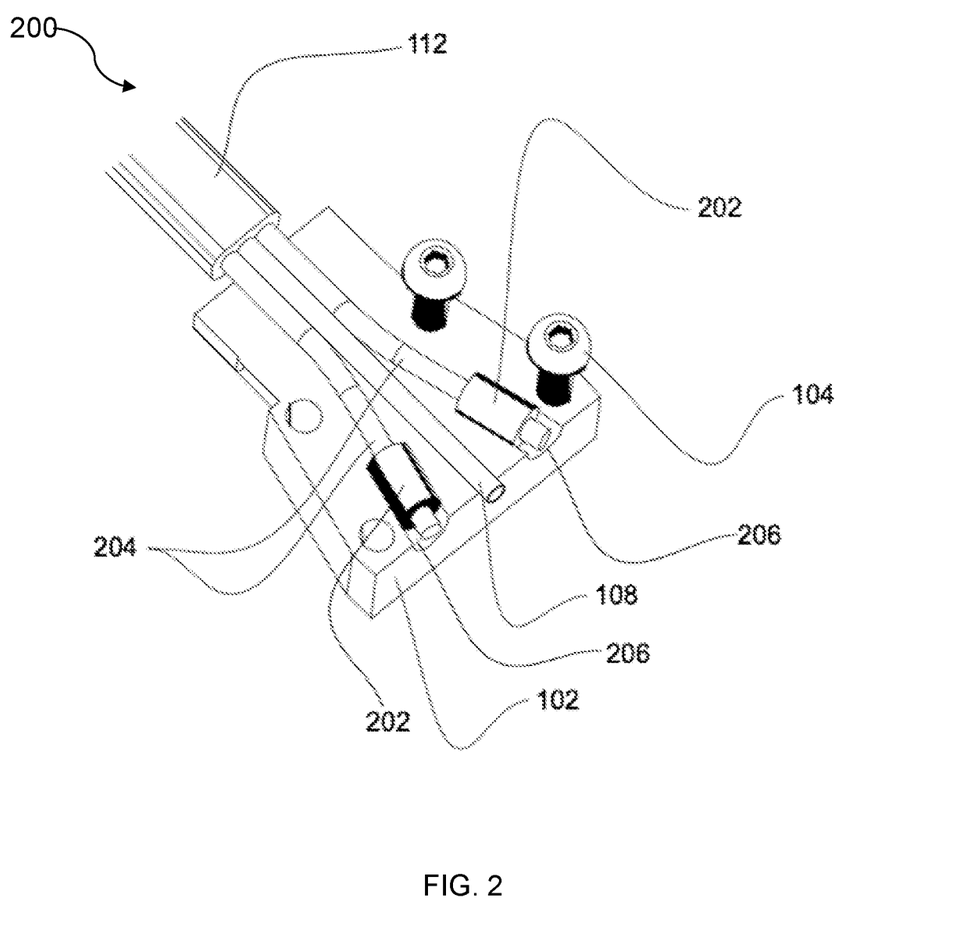
FIG. 2 is a pictorial representation illustrating an exemplary arrangement over a lower clamp member of the optical fibre cable clamping apparatus in accordance with an embodiment of the present invention.

In accordance with an embodiment of the present invention, each of the lower clamp member 102 and the upper clamp member 106 have the grooved fibre extension 110 to provide passage and place one or more optical fibre elements 108. Similarly, each of the lower clamp member 102 and the upper clamp member 106 may have the two grooved strength member extension 206 to provide passage to the two strength members 204.

Alternatively, the optical fibre cable clamping apparatus 100 may have more than two grooved strength member extension 206.

In accordance with an embodiment of the present invention, the upper clamp member 106 and the lower clamp member 102 have epoxy coating.

Alternatively, each of the upper clamp member 106 and the lower clamp member 102 may have any other suitable coating.

The epoxy coating on the upper clamp member 106 and the lower clamp member 102 enhances various properties of the upper clamp member 106 and the lower clamp member 102. The various properties may include, but not limited to, durability, rigidity, hardness, abrasion resistance, impact resistance and chemical resistance. Additionally, the epoxy coating may enhance the various mechanical properties due to an epoxy resin and a polyamine hardener.

In accordance with an embodiment of the present invention, the optical fibre cable clamping apparatus 100 may include at least two anchor hooks for locking the upper clamp member 106 with the lower clamp member 102. In particular, at least two anchor hooks may be provided either on the upper clamp member 106 and/or on the lower clamp member 102.

In accordance with an embodiment of the present invention, the optical fibre cable clamping apparatus 100 may include at least two slots where the two anchor hooks may be latched to lock the upper clamp member 106 with the lower clamp member 102.

In accordance with one embodiment of the present invention, at least two slots may be provided on the lower clamp member 102.

In accordance with alternate embodiment of the present invention, at least two slots may be provided on the upper clamp member 106.

In an example, at least two slots may have a rectangular shape.

In another example, at least two slots may have a square shape.

In yet another example, at least two slots may have any suitable shape.

In accordance with an embodiment of the present invention, all the elements of the optical fibre cable clamping apparatus 100 may operate coherently and synchronously to clamp and secure an optical fibre cable 112.

FIG. 2 is a pictorial representation illustrating an exemplary arrangement 200 over a lower clamp member 102 of the optical fibre cable clamping apparatus 100 in accordance with an embodiment of the present invention. Particularly, the exemplary arrangement 200 includes crimp sleeves 202, two strength members 204, a lower clamp member 102, at least one elongated member 104, and one or more optical fibre elements 108.

In another exemplary arrangement 200 may include two circular crimp sleeves.

In accordance with an embodiment of the present invention, the crimp sleeves 202 may be provided for securing the two strength members 204 within the two grooved strength member extension 206. In particular, each of the two grooved strength member extension 206 may have one or more cavities. Particularly, one or more cavities may accommodate one or more crimp sleeves that may be crushed on to the two strength members 204 of the optical fibre cable 112, thereby preventing outward axial movement of the optical fibre cable 112 by application of force.

In accordance with an embodiment of the present invention, each of the crimp sleeves 202 may be locked inside a corresponding strength member extension of the two grooved strength member extension 206. Thus, the crimp sleeves 202 prevent movement of the two strength members 204 and provide resistance to axial pull force of the two strength members 204.

In accordance with an embodiment of the present invention, the two strength members 204 is positioned diametrically opposite to each other and one or more optical fibre elements 108 in the optical fibre cable 112.

In accordance with an embodiment of the present invention, the two grooved strength member extension 206 may be formed between the upper clamp member 106 and lower clamp member 102 for providing a passage to the two strength members 204. Particularly, the two strength members 204 are attached in the two grooved strength member extension 206.

In accordance with an embodiment of the present invention, the two strength members 204 are attached to the two grooved strength member extension 206 by a glue.

In accordance with an alternative embodiment of the present invention, the two strength members 204 are attached to the two grooved strength member extension 206 by one or more crimps.

In accordance with an embodiment of the present invention, strength member extension 206 operably coupled with the upper clamp member 106 and the lower clamp member 102. In particular, the upper clamp member 106 may be placed over the lower clamp member 102 to form a sandwich assembly to prevent axial movements of the two strength members 204 and one or more optical fibre elements 108.

In accordance with an alternative embodiment of the present invention, the optical fibre cable clamping apparatus 100 may enable compact anchoring of the two strength members 204 and one or more optical fibre elements 108. In particular, the clamping of the two strength members 204 and one or more optical fibre elements 108 are performed after removing external protective sheath of the optical fibre cable 112.

In accordance with an alternative embodiment of the present invention, the two grooved strength member extension 206 is positioned at an angle to the grooved fibre extension 110.

In accordance with an alternative embodiment of the present invention, the two grooved strength member extension 206 may be at an angle to the grooved fibre extension 110.

In accordance with an embodiment of the present invention, the two strength members 204 may split apart forming a "Y" profile into the optical fibre cable clamping apparatus 100. Particularly, the "Y" profile is formed on each of the upper clamp member 106 and the lower clamp member 102 due to the two grooved strength member extensions.(As illustrated in an exemplary arrangement 200 in FIG. 2).

FIG. 3 and FIG.4 are pictorial representations illustrating first perspective view 300 and second perspective view 400 of the optical fibre cable clamping apparatus 100 inside the terminal 302 in accordance with one or more embodiments of the present invention. In particular, the optical fibre cable clamping apparatus 100 may comprise at least one elongated member 104 on the first side of the lower clamp member 102 and the upper clamp member 106. The first side of the lower clamp member 102 may operatively be coupled to the base 304. Moreover, the base 304 may have at least one cavity to accommodate at least one elongated member 104, thereby preventing outward axial movement of the optical fibre cable 112. Further, the lower clamp member 102 may operably be coupled with the upper clamp member 106 through at least one elongated member 104.

In accordance with an embodiment of the present invention, at least one elongated member 104 is a screw. Generally, a screw corresponds to mechanical fasteners that are used to join two or more elements.

Alternatively, other types of fasteners may also be utilized in accordance with one or more embodiments of the present disclosure.

In an exemplary example, may have at least one elongated member 104 may have tapered shank.

In another example, at least one elongated member may have a non-tapered shank.

In yet another exemplary example, at least one elongated member 104 may have in-built washers.

In accordance with an embodiment of the present invention, at least one elongated member 104 is not limited to above mentioned screws.

In accordance with an embodiment of the present invention, the optical fibre cable clamping apparatus 100 further comprises a terminal 302 to clamp the two strength members 204 and one or more optical fibre elements 108 that enter into the terminal 302.

In general, the terminal is referred to as a point at which a conductor from a component, device or network comes to an end.

In an embodiment of the present invention, the terminal 302 may also refer to an electrical connector at this endpoint, acting as the reusable interface to a conductor and creating a point where external circuits can be connected.

In yet another embodiment of the present invention, the terminal 302 may simply be the end of a wire or it may be fitted with a connector or fastener.

Figure 5:
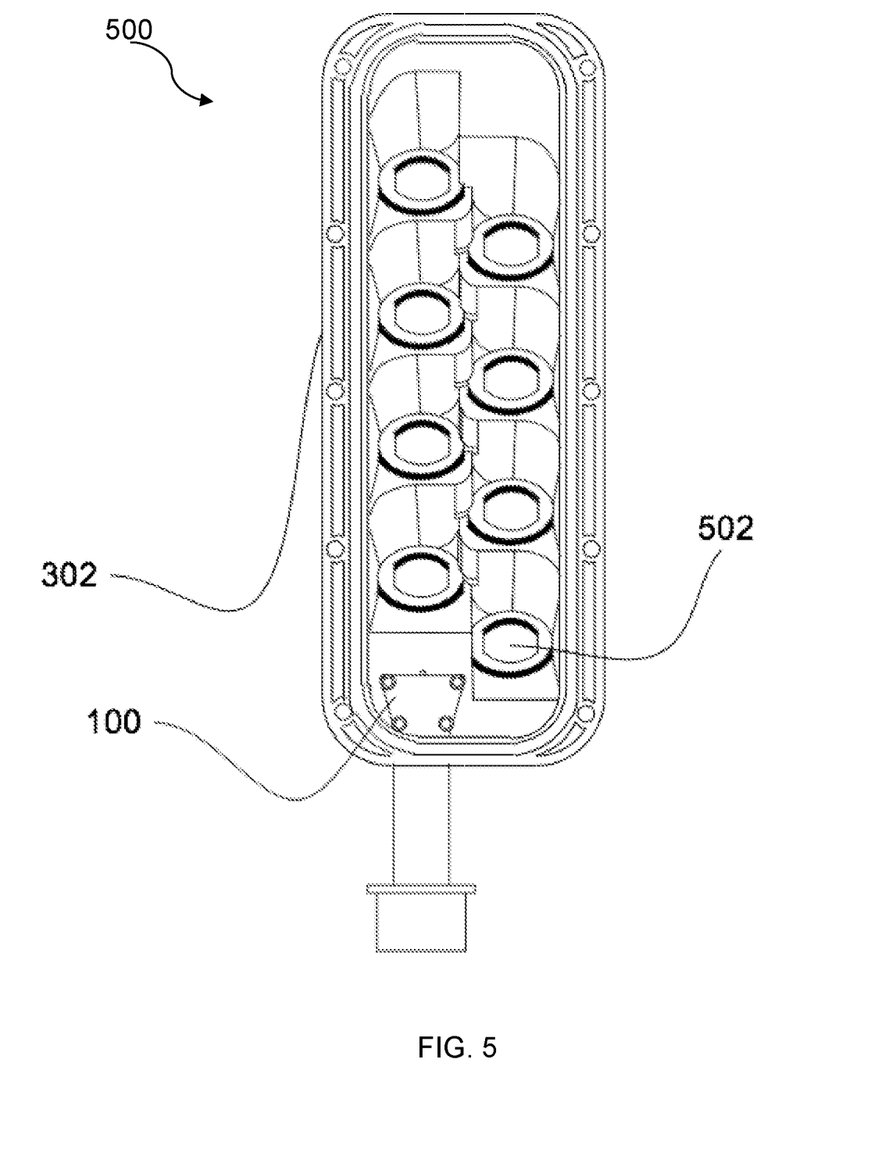
FIG. 5 is a pictorial representation illustrating the optical fibre cable clamping apparatus inside the terminal having staggered ports in accordance with one embodiment of the present invention.

FIG. 5 is a pictorial representation illustrating the optical fibre cable clamping apparatus inside the terminal having staggered ports in accordance with one embodiment of the present invention. Particularly, the optical fibre cable clamping apparatus 100 may be used to clamp the optical fibre cable 112 with the terminal 302 having a staggered port 502.

Figure 6:
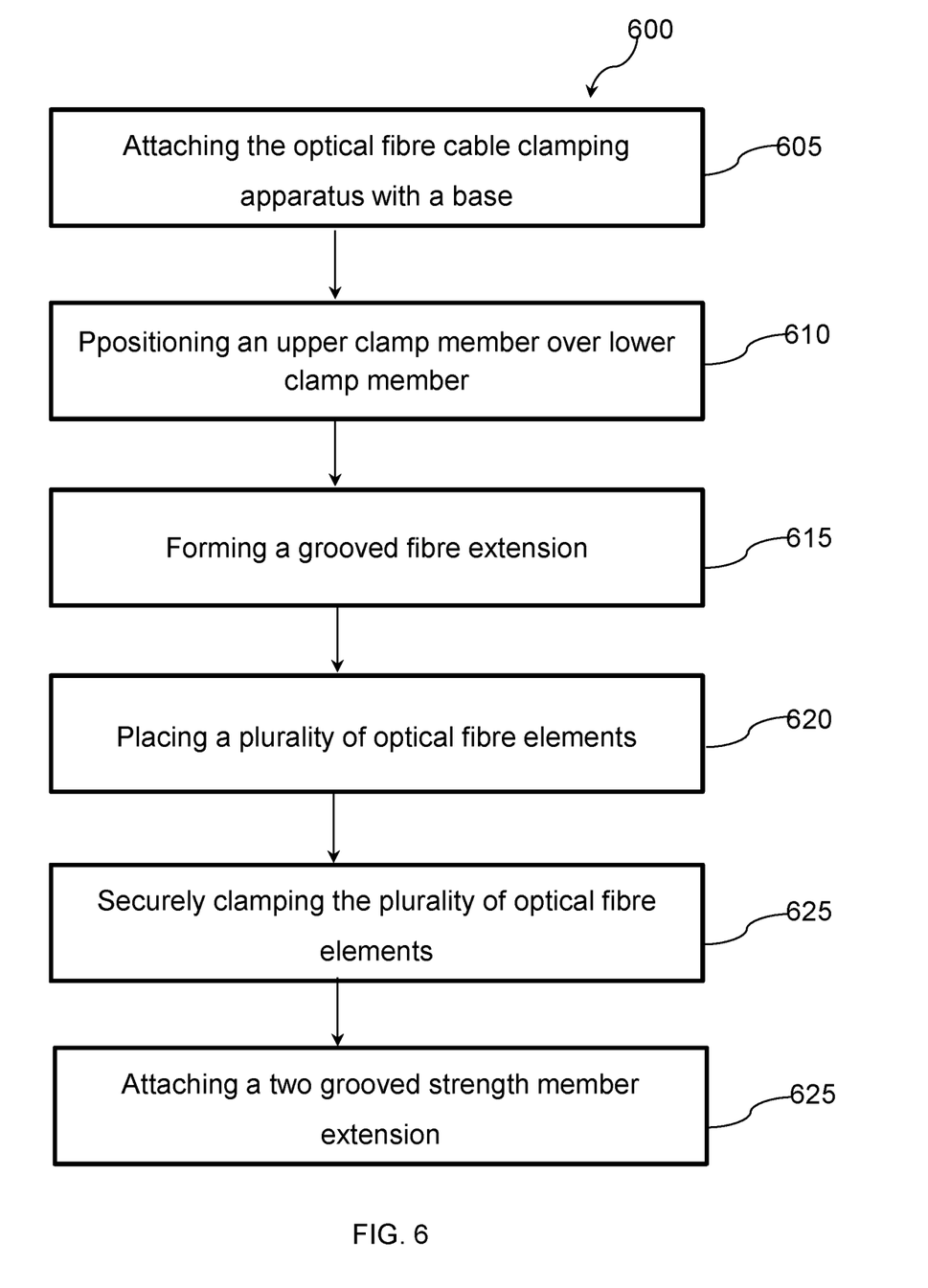
FIG. 6 is a flowchart illustrating a method for clamping an optical fibre cable in an optical fibre cable clamping apparatus in accordance with one embodiment of the present invention.

FIG. 6 is a flowchart illustrating a method for clamping an optical fibre cable in an optical fibre cable clamping apparatus in accordance with one embodiment of the present invention. The method starts at step 605 and proceeds to step 610. At step 605, the optical fibre cable clamping apparatus 100 is attached to the base 304 of optical fibre cable clamping apparatus 100.

At step 610, the upper clamp member 106 is placed over the lower clamp member 102 to form a sandwich assembly to prevent axial movements of the two strength members 204 and one or more optical fibre elements 108. In particular, the lower clamp member 102 is operably coupled to the upper clamp member 106 and the base 304.

Step 610 proceeds to step 615. At step 615, a grooved fibre extension 110 is formed in the lower clamp member 102 and the upper clamp member 106. In particular, the Step 615 proceeds to step 620. At step 620, one or more optical fibre elements 108 are placed in the grooved fibre extension 110.

Step 620 proceeds to step 625. At step 625, one or more optical fibre elements 108 are securely clamped to the optical fibre cable clamping apparatus 100.

Step 625 proceeds to step 630. At step 630, the two grooved strength member extension 206 is attached with the upper clamp member 106 and the lower clamp member 102. In particular, the two grooved strength member extension 206 is operably coupled to attach the two strength members 204. Moreover, the two strength members 204 are attached to the two grooved strength member extension 206 by a glue and/or a plurality of crimps.

In accordance with another embodiment of the present invention, the method comprises positioning the two strength members 204 diametrically opposite to each other and one or more optical fibre elements 108 in the optical fibre cable 112.

In accordance with yet another embodiment of the present invention, the method comprises coating the upper clamp member 106 and the lower clamp member 102 with an epoxy.

In accordance with yet another embodiment of the present invention, the method comprises positioning at least one elongated member 104 on the first side of the lower clamp member 102 and the upper clamp member 106 and locking the upper clamp member 106 with the lower clamp member 102 with at least two anchor hooks.

In accordance with yet another embodiment of the present invention, the method comprises clamping the optical fibre cable 112 with a terminal 302 having a staggered port 502.

It may be noted that the flowchart 600 is explained to have above stated process steps, however, those skilled in the art would appreciate that the flowchart 600 may have more/less number of process steps which may enable all the above stated embodiments of the present disclosure.

The present invention of the optical fibre cable clamping apparatus advantageously clamps and secures one or more optical fibre elements and the two strength members for unobstructed and safe distribution of the optical fibre cable.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

What is claimed is:

1. An optical fibre cable clamping apparatus for clamping an optical fibre cable attached to a base, wherein the optical fibre cable clamping apparatus comprising:

an upper clamp member;

a lower clamp member operably coupled to the upper clamp member and the base;

a grooved fibre extension formed operably coupled to the upper clamp member and the lower clamp member;

a plurality of optical fibre elements securely clamped to the optical fibre cable clamping apparatus and placed in the grooved fibre extension; and two grooved strength member extension operably coupled with the upper clamp member and the lower clamp member, wherein the two grooved strength member extension is operably coupled to attach two strength members, wherein the two grooved strength member extension is positioned at an angle to the grooved fibre extension such that the angle is not equal to zero.

2. The optical fibre cable clamping apparatus as claimed in claim 1, wherein the two strength members are positioned diametrically opposite to each other and the plurality of optical fibre elements in the optical fibre cable.

3. The optical fibre cable clamping apparatus as claimed in claim 1, wherein the two strength members are attached to the two grooved strength member extension by a glue.

4. The optical fibre cable clamping apparatus as claimed in claim 1, wherein the two strength members are attached to the two grooved strength member extension by a plurality of crimps.

5. The optical fibre cable clamping apparatus as claimed in claim 1, wherein each of the two grooved strength member extension has at least one cavity with a plurality of crimp sleeves for crushing onto the two strength members of the optical fibre cable.

6. The optical fibre cable clamping apparatus as claimed in claim 1, wherein a plurality of crimp sleeves are locked inside corresponding to the two strength members of the two grooved strength member extension.

7. The optical fibre cable clamping apparatus as claimed in claim 1, wherein the upper clamp member and the lower clamp member are coated with an epoxy coating.

8. The optical fibre cable clamping apparatus as claimed in claim 1, wherein the optical fibre cable clamping apparatus further comprising at least one elongated member on a first side of the lower clamp member and the upper clamp member.

9. The optical fibre cable clamping apparatus as claimed in claim 8, wherein the first side of the lower clamp member is operatively coupled to the base having at least one cavity to accommodate the at least one elongated member.

10. The optical fibre cable clamping apparatus as claimed in claim 8, wherein the at least one elongated member is a screw.

11. The optical fibre cable clamping apparatus as claimed in claim 1, wherein the optical fibre cable clamping apparatus is configured to clamp the optical fibre cable with a terminal having a staggered port.

12. A method of clamping an optical fibre cable in an optical fibre cable clamping apparatus, the method comprising:

attaching the optical fibre cable clamping apparatus with a base;

positioning an upper clamp member over a lower clamp member, wherein the lower clamp member is operably coupled to the upper clamp member and the base;

forming a grooved fibre extension coupled to the lower clamp member and the upper clamp member;

placing a plurality of optical fibre elements in the grooved fibre extension;

securely clamping the plurality of optical fibre elements to the optical fibre cable clamping apparatus; and attaching two grooved strength member extension with the upper clamp member and the lower clamp member, wherein the two grooved strength member extension is operably coupled to attach two strength members, wherein the two grooved strength member extension is positioned at an angle to the grooved fibre extension such that the angle is not equal to zero.

13. The method as claimed in claim 12, wherein the method comprising positioning the two strength members diametrically opposite to each other and the plurality of optical fibre elements in the optical fibre cable.

14. The method as claimed in claim 12, wherein the two strength members are attached to the two grooved strength member extension by a glue and/or a plurality of crimps.

15. The method as claimed in claim 12, wherein the method comprises coating of the upper clamp member and the lower clamp member with an epoxy coating.

16. The method as claimed in claim 12, wherein the method comprises positioning at least one elongated member on a first side of the lower clamp member and the upper clamp member.

17. The method as claimed in claim 12, wherein the method comprises clamping the optical fibre cable with a terminal having a staggered port.

* * * * *